United States Patent
Yuvaraj et al.

(10) Patent No.: US 9,628,409 B1
(45) Date of Patent: Apr. 18, 2017

(54) DESIGNATED FORWARDER ELECTION FOR MULTI-HOMED DATA CENTER INTERCONNECT USING MULTICAST ROUTING PROTOCOL STATE INFORMATION

(71) Applicant: Juniper Networks, Inc., Sunnyvale, CA (US)

(72) Inventors: Venkatesan Yuvaraj, Sunnyvale, CA (US); Sunesh Rustagi, San Jose, CA (US); Shrinivasa Kini, Santa Clara, CA (US); Tapraj Singh, San Ramon, CA (US); Ragupathi J, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 84 days.

(21) Appl. No.: 14/644,683

(22) Filed: Mar. 11, 2015

(51) Int. Cl.
*H04L 12/931* (2013.01)
*H04L 29/06* (2006.01)

(52) U.S. Cl.
CPC ........ *H04L 49/201* (2013.01); *H04L 65/1026* (2013.01)

(58) Field of Classification Search
None
See application file for complete search history.

(56) References Cited

U.S. PATENT DOCUMENTS

| | | | |
|---|---|---|---|
| 2013/0201986 A1* | 8/2013 | Sajassi | H04L 45/48 370/390 |
| 2013/0254359 A1* | 9/2013 | Boutros | H04L 61/103 709/223 |
| 2014/0086253 A1* | 3/2014 | Yong | H04L 12/4633 370/395.53 |
| 2014/0177640 A1* | 6/2014 | Yang | H04L 45/586 370/401 |

(Continued)

OTHER PUBLICATIONS

Adams et al. "Protocol Independent Multicast Version 2—Dense Mode Specification (PIM-DM): Protocol Specification (Revised)", Network Working Group, RFC 3973, Jan. 2005, 56 pgs.

(Continued)

*Primary Examiner* — Brian Roberts
(74) *Attorney, Agent, or Firm* — Shumaker & Sieffert, P.A.

(57) ABSTRACT

Techniques are described for supporting designated forwarder election for a multi-homed Ethernet virtual private network (EVPN) data center interconnect (DCI) between multiple data centers by leveraging and utilizing adjacency state information learned from a multicast routing protocol that controls multicast distribution within an underlying transport network of a local data center. For example, a set or routers operating to provide a multi-homed EVPN DCI may utilize adjacency state information learned from a Protocol Independent Multicast (PIM) executing within the underlying transport network of a multi-homed data center to facilitate selection of a designated forwarder for the (Continued)

EVPN between the data centers. By leveraging adjacency state information, an enhanced DF election may be automatically performed for the EVPN to facilitate selection of a designated forwarder in a manner that may avoid loss of traffic in situations where a topology event in the underlying transport network of the data center.

19 Claims, 4 Drawing Sheets

(56) References Cited

U.S. PATENT DOCUMENTS

| | | | | |
|---|---|---|---|---|
| 2015/0003450 | A1* | 1/2015 | Salam | H04L 12/1836 370/390 |
| 2015/0071080 | A1* | 3/2015 | Sajassi | H04L 45/126 370/238 |
| 2016/0021015 | A1* | 1/2016 | Thoria | H04L 47/2483 370/235 |
| 2016/0119156 | A1* | 4/2016 | Drake | H04L 45/16 709/223 |
| 2016/0127320 | A1* | 5/2016 | Badoni | H04L 63/0281 726/12 |
| 2016/0134528 | A1* | 5/2016 | Lin | H04L 45/66 709/238 |

OTHER PUBLICATIONS

Boutros et al. "VXLAN DCI Using EVPN", draft-boutros-l2vpn-vxlan-evpn-04.txt, Internet-Draft, Jul. 2, 2014, 14 pgs.

Fenner et al. "Protocol Independent Multicast—Sparse Mode (PIM-SM): Protocol Specification (Revised)" Network Working Group, RFC 4601, Aug. 2006, 112 pgs.

Handley et al. "Bidirectional Protocol Independent Multicast (BIDIRPIM)" Network Working Group, RFC 5015, Oct. 2007, 43 pgs.

Holbrook et al. "Source-Specific Multicast for IP", Network Working Group, RFC 4607, Aug. 2006, 18 pgs.

Sajassi et al. "BGP MPLS Based Ethernet VPN" draft-ietf-l2vpn-evpn-11, Network Working Group, Internet-Draft, Oct. 18, 2014, 52 pgs.

* cited by examiner

DESIGNATED FORWARDER ELECTION FOR MULTI-HOMED DATA CENTER INTERCONNECT USING MULTICAST ROUTING PROTOCOL STATE INFORMATION

TECHNICAL FIELD

The invention relates to computer networks and, more specifically, to forwarding network traffic within computer networks.

BACKGROUND

A data center is a specialized facility that provides data serving and backup as well as other network-based services for subscribers and other entities. A data center in its most simple form may consist of a single facility that hosts all of the infrastructure equipment, such as networking and storage systems, servers, redundant power supplies, and environmental controls.

More sophisticated data centers may be provisioned for geographically dispersed organizations using subscriber support equipment located in various physical hosting facilities (sites). As a result, techniques have been developed to interconnect two more physical data centers to form a single, logical data center. One example layer two (L2) interconnect is an Ethernet virtual private network (EVPN) data center interconnect (DCI) through an intermediate network coupling multiple physical data centers.

An EVPN DCI is often used to extend two or more remote layer two (L2) customer networks of geographically separate data centers through an intermediate layer three (L3) network in a transparent manner, i.e., as if the intermediate L3 network does not exist. The EVPN transports L2 communications, such as Ethernet packets or "frames," between customer networks via the intermediate network. In a typical configuration, provider edge (PE) network devices (e.g., routers and/or switches) coupled to the customer edge (CE) network devices of the customer networks define label switched paths (LSPs) (also referred to as pseudowires) within the provider network to carry encapsulated L2 communications as if these customer networks were directly attached to the same local area network (LAN). In some configurations, the PE network devices may also be connected by an IP infrastructure in which case IP/GRE tunneling or other IP tunneling can be used between the data centers.

In a multi-homed EVPN configuration, a data center may be multi-homed to the intermediate EVPN by an Ethernet segment provided by multiple PE network devices. That is, the multiple PE network devices are coupled to the data center by separate access links that logically operate as a single Ethernet segment and, therefore, provide multi-homed connectivity to the EVPN for one or more customer networks within the local data center. In such a configuration, one of the multiple PE network devices in the Ethernet segment operates as a designated forwarder with respect to each EVPN instance running over the Ethernet segment and forward Ethernet frames for that EVPN instance using the Ethernet segment.

SUMMARY

This disclosure describes techniques for supporting designated forwarder election for a multi-homed Ethernet virtual private network (EVPN) data center interconnect (DCI) between multiple data centers by leveraging and utilizing adjacency state information learned from a multicast routing protocol that controls multicast distribution within an underlying transport network of a local data center. For example, a set or routers operating to provide a multi-homed EVPN DCI may utilize adjacency state information learned from a Protocol Independent Multicast (PIM) protocol executing within the underlying transport network of a multi-homed data center to facilitate selection of a designated forwarder for the EVPN between the data centers. By leveraging adjacency state information, an enhanced DF election may be automatically performed for the EVPN to facilitate selection of a designated forwarder in a manner that may avoid loss of traffic in situations where a topology event in the underlying transport network of the data center.

In one example, a method comprises executing, with a first provider edge (PE) router of a plurality of PE routers coupled to a first data center, an Ethernet virtual private network (EVPN) protocol to establish an EVPN data center interconnect (DCI) between the first data center and a second data center, wherein the plurality of PE routers of the first data center provide multi-homed connectivity to the EVPN. The method further comprises executing, with the first PE router a multicast routing protocol, to establish one or more tunnels within the first data center to transport multicast traffic between the first PE router and one or more customer networks within the first data center; and based on a current status of the one or more tunnels within the first data center, selectively participating, with the first PE router, in a designated forwarder (DF) election of one or more of the PE routers for forwarding traffic from the EVPN into the first data center.

In another example, a router comprises a routing engine having a processor executing an EVPN protocol to establish a DCI between a first data center and a second data center using an EVPN, wherein the router is one of a plurality of PE routers that are multi-homed to the first data center and that provide the EVPN DCI. The router further comprises a multicast routing protocol to establish one or more tunnels within the first data center to transport multicast traffic from the router to one or more customer networks within the first data center. The multicast routing protocol outputs an alert to the EVPN protocol to indicate a current status of the one or more tunnels within the first data center. Further, based on a current status of the one or more tunnels, the EVPN protocol selectively includes the router as a candidate for EVPN DF election of one or more of the PE routers for forwarding traffic from the EVPN into the the first data center.

In another example, a computer-readable medium comprising instruction that cause a processor of a router of two or more multi-homed PE routers of an EVPN coupled to a first data center to: execute, with the router, an EVPN protocol to establish an EVPN DCI between the first data center and a second data center; execute, with the router a multicast routing protocol, to establish one or more tunnels within the first data center to transport multicast traffic between the first PE router and one or more customer networks within the first data center; and based on a current status of the one or more tunnels within the first data center, selectively participate, with the router, in a DF election of one or more of the PE routers for forwarding traffic from the EVPN into the first data center.

The details of one or more examples are set forth in the accompanying drawings and the description below.

DETAILED DESCRIPTION

Figure 1:
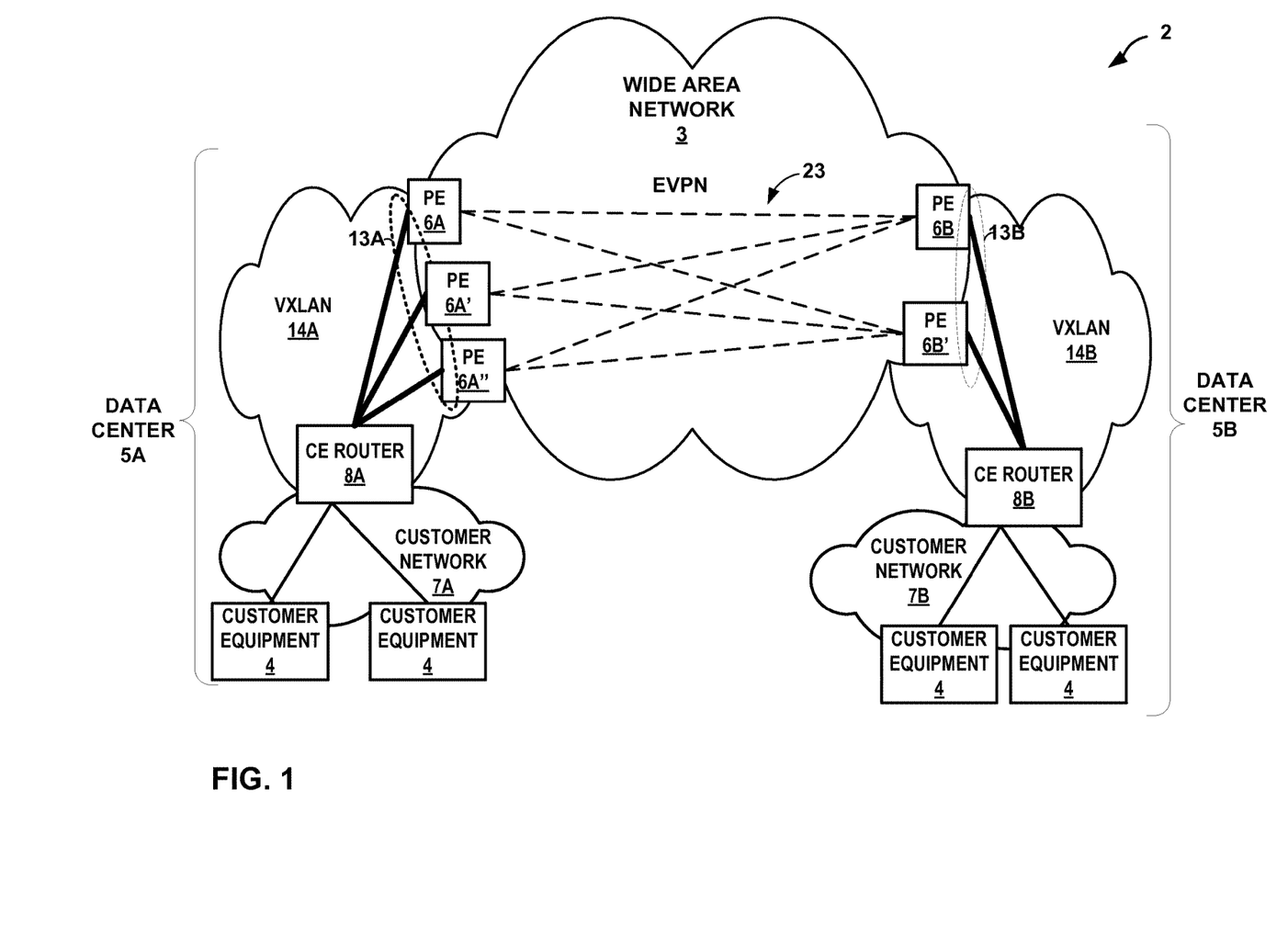
FIG. 1 is a block diagram illustrating an example network system in which routers provide designated forwarder election for an Ethernet segment of an EVPN data center interconnect (DCI) between data centers by utilizing adjacency state information learned from a multicast routing protocol operating within a local data center.

FIG. 1 is a block diagram illustrating an example network system in which routers provide designated forwarder election for an Ethernet segment of an EVPN by utilizing adjacency state information learned from a multicast routing protocol operating within a local data center. For example, the routers providing the Ethernet segment may utilize adjacency state information learned from a Protocol Independent Multicast (PIM) protocol executing within the local data center to facilitate selection of a designated forwarder for the Ethernet segment.

In the example of FIG. 1, data centers 5A-5B (collectively, "data centers 5") are networks having specialized facilities that provide storage, management, and dissemination of data to subscribers and other entities. Example data centers 5A, 5B includes a plurality of physical and/or logical customer networks having customer equipment, such as customer networks 7A, 7B having customer equipment 4 that provide computing environments for subscribers/customers. Customer equipment 4 may connect to data centers 5 to request and receive services and data provided by data centers 5. In some instances, data centers 5A, 5B are geographically dispersed facilities, or "sites," of an overall data center to provide geographical redundancy against localized failure of one of the data centers.

In this example, data centers 5 are interconnected by a wide area network (WAN) 3. In general, WAN 3 represents a layer three (L3) network and may include multiple intermediate routing and switching devices (not shown) that transport data traffic over links between data centers 5. For example, wide area network 4 may implement Multiprotocol Label Switching (MPLS) techniques and may be referred to as an MPLS/IP network. While described as a wide area network, WAN 3 may represent any network capable of transmitting traffic exchanged between provider edge routers (PEs) 6.

For example, provider edge routers (PEs) 6A, 6A', 6A", 6B and 6B' (collectively, "PEs 6") may utilize Ethernet VPN (E-VPN) technology through WAN 3 to provide an EVPN data center interconnect (DCI) between data centers 5A and 5B. In this way, PEs 6 provide an EVPN 23 to transport L2 communications for customer networks 7 of data centers 5 through an intermediate network (WAN 3), in a transparent manner, i.e., as if the intermediate network does not exist and data centers 5 were instead directly connected.

In particular, each of PEs 6 provide the EVPN 23 to transport L2 communications, such as Ethernet packets or "frames," through WAN 3 for one or more customer networks 7 of data centers 5. Moreover, customer equipment 4 of different customer networks 7 provided within each data center 5 may be virtually isolated onto different Virtual Extensible LANs (VXLANs) 14. Each of data centers 5 includes an underlay network of transport routers that transport L2 communications for customer networks 7A, 7B through respective VXLANs 14 for that customer. As such, PEs 6 may receive customer traffic from local VXLANs 14 and forward the traffic through WAN 3 via the EVPN 23. Similarly, PEs 6 may receive L2 communications from EVPN 23 and forward the L2 communications via VXLANs 14 for transport through the local data centers 5 via the respective underlay networks.

In this way, PEs 6 provide a multi-homed EVPN/VXLAN data center interconnect (DCI) between data centers 5. As such, each of PEs 6 operates as gateway between EVPN 23 and VXLANs 14, and may function as VXLAN Tunnel Endpoints ("VTEPs") with respect to VXLANs 14. That is, each PE 6 may include logically separate routing instances for VXLAN 14 and EVPN 23 and each operates to bridge traffic between the two distinct internal routing instances. Further example structural and functional details of the EVPN/VXLAN DCI implemented by PE routers 6 are described in "VXLAN DCI Using EVPN," draft-boutros-l2vpn-vxlan-evpn-04.txt, Internet Engineering Task Force (IETF), Jul. 2, 2014, the entire contents of which are incorporated herein by reference.

As shown in FIG. 1, each data center 5A, 5B is multi-homed to WAN 3 by respective Ethernet segments 13 for redundancy, load balancing or both. Further, data center-facing ports of PE routers 6A are configured as a logically bundled Ethernet segment 13A such that PEs 6A, 6A', 6A" operate to provide either single-active or active-active multi-homed L2 connectively to customer edge router (CE) 8A of data center 5A. Similarly, data center-facing ports of PE routers 6B, 6B' are configured to operate as Ethernet segment 13B such that PEs 6B, 6B' provide either single-active or active-active multi-homed L2 connectively to CE 8B of data center 5B.

One of the multiple PE network devices in each of the Ethernet segments is elected to operate as a designated forwarder (DF) to forward Ethernet frames in the Ethernet segment for the customer network device, thereby avoiding traffic loops within VXLANs 14. For example, PE 6A may be elected the designated forwarder for Ethernet segment 13A with respect to unicast traffic as well as broadcast, unidentified unicast and multicast (BUM) traffic received from EVPN 23. In other words, traffic from EVPN 23 and destined for customer network 7A can be received over the MPLS/IP network at any of the PEs 6A, 6A', 6A". As designated forwarder, PE 6A forwards the traffic into Ethernet segment 13A while PE 6A' and PE 6A" drop the traffic. Similarly, traffic from VXLAN 13A can arrive at any of PEs 6A, 6A', 6A" of Ethernet segment 13A and is forwarded by PE router 6A over the MPLS/IP WAN network 4 via EVPN 23.

The remaining PEs (i.e., non-DF) in each Ethernet segment 13A, 13B are configured as backup PE network devices to provide redundancy. When a network failure occurs with respect to the current designated forwarder, the backup PE network devices execute a designated forwarder election algorithm to determine which of the backup PE network devices will become the new designated forwarder and, as a result, assume responsibility for forwarding layer two communications for the customer network device.

In some situations, election of a designated forwarder with respect to forwarding traffic to and from EVPN 23 may result in temporary traffic loss, referred to as "black holing," with respect to packets received from EVPN 23. For example, current designated forwarder election techniques with respect to EVPN 23 are unable to take into account topology and network state information for nodes and/or links within the underlying transport network on which the overlay VXLANs 14s operate. As such, situations may arise in which failure of a link or node within the underlying transport network may prevent the newly elected designated forwarder of PEs 6 from successfully forwarding traffic from EVPN 23 to customer networks 7.

This disclosure describes techniques in which routers that provide Ethernet segments for EVPNs, such as PEs 6, perform an enhanced designated forwarder election for the Ethernet segments by utilizing adjacency state information of VXLANs 14 learned from interior multicast routing protocols operating within local data centers 5A, 5B, respectively. For example, in general, routers within the underlay network on which VXLAN operates, including CEs 8 and data-center facing routing instances of PEs 6, execute a multicast routing protocol, such as protocol independent multicast (PIM), to control transport of multicast traffic internal to each data center 5, e.g., by establishing tunnels, such as VXLAN tunnels, to transport the multicast traffic. In some examples, the routers may support either or both Protocol Independent Multicast Bidirectional Mode (PIM-BIDIR) and Protocol Independent Multicast Sparse Mode (PIM-SM). Moreover, although black-holing may be most common in single-active EVPN configurations, the techniques described herein may apply to active-active EVPN configurations as well.

As described herein, PEs 6A, 6A', 6A" providing multi-homed connectivity to EVPN 23 via Ethernet segment 13A leverage and utilize adjacency state information learned from the multicast routing protocol executing local to data center 5A to facilitate selection of a designated forwarder for the Ethernet segment 13A. Any failure of routers or switches within the underlying transport network within data center 5A, for example, will be reflected in the adjacency state information of the interior multicast routing protocol. By incorporating the adjacency state information within DF election and re-election for the Ethernet segment with respect to EVPN 23, traffic loss may be avoided.

Figure 2:
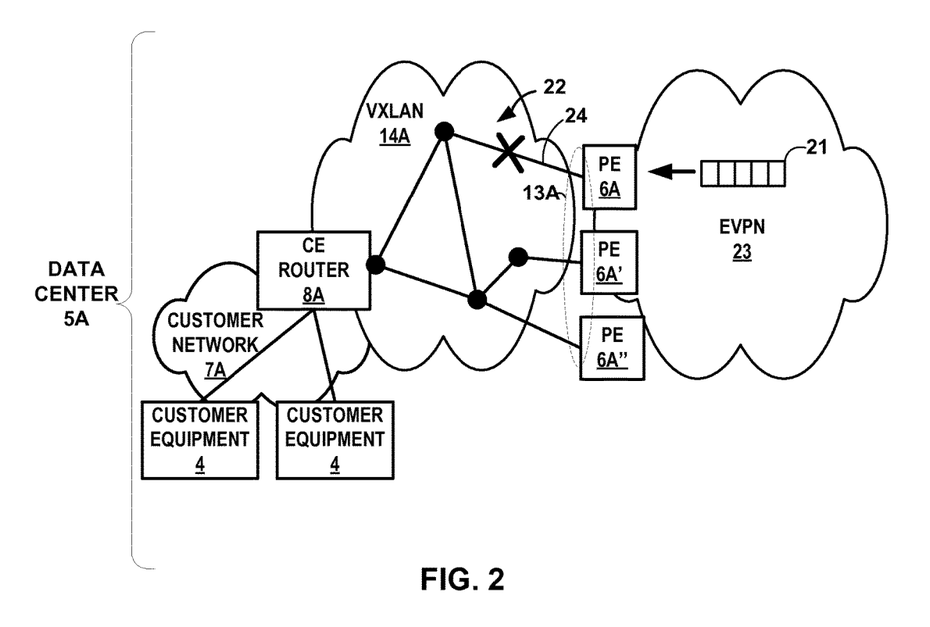
FIG. 2 is a block diagram illustrating in further detail portions of the example network system of FIG. 1.

FIG. 2 is a block diagram illustrating in further detail portions of the example network system of FIG. 1 in accordance with the techniques described herein. In the example of FIG. 2, a network event, such as failure of link 24, has occurred within the underlying transport network within data center 5A so as to prevent communication between data center-facing port(s) of PE 6A and CE router 8A via overlay VXLAN 14A.

Under a failure condition as shown in FIG. 1, it is possible that CE 8A becomes isolated from PE 6A for one or more Ethernet segments, such as Ethernet segment 13A. Moreover, conventionally, such a scenario may cause PEs 6A, 6A' to black hole traffic from EVPN 23. That is, initially, remote PEs 6B, 6B' continue to forward traffic 21 to PE 6A as the initial DF with respect to EVPN 23. PE 6A receives traffic 21 from EVPN 23 but is unable to forward the traffic to CE 8A and, therefore, drops the traffic.

For example, conventional DF election for a given Ethernet segment occurs on a per EVPN instance (EVI). That is, conventionally PEs of a multi-homed EVPN coupled to an Ethernet segment would perform DF election for each Ethernet segment for each EVPN instance. Table 1 illustrates an example in which PE 6A, PE 6A' and PE 6A" are configured with handling services for EVPN instances having VXLAN Network Identifiers (VNIs) 99, 100, 101, 103, 104, 105, 107, 108 and 109. Table 1 shows example EVPN Instance (EVI) service name, EVI distribution and DF mapping. Moreover, Table 1 illustrates results of one example conventional DF election technique in which each PE maintains, for each EVPN EVI, an ordered list of PEs based on the loopback address configured on the PEs. In the conventional technique, DF election is performed, for each Ethernet Segment Identifier (ESI) for each EVI, using a process in which each PE: 1) identifies a minimum VNI ID for the ESI/EVI combination, 2) computes a modulo of the minimum VNI ID by the number of PEs in that ESI/EVI, and 3) elects the PE having that position in the order list. For example, for EVI A, the lowest VNI for any of the PEs is 99. Applying a modulo of 3, which is the number of PEs, results in 0, which maps to the lowest position in the ordered list of {PE 6A, PE 6A', PE 6"}, resulting in DF election of PE 6A. Similarly, DF election for EVIs B and C result in DF election of PE 6A' and PE 6A", respectively, according to this conventional technique.

TABLE 1

| EVI Name | VXLAN VNI | Designated Forwarder |
| --- | --- | --- |
| A | 99-101 | PE 6A |
| B | 103-105 | PE 6' |
| C | 107-109 | PE 6A" |

However, as described herein, PEs that provide multi-homed connectivity for a data center interconnect, such as an EVP via an Ethernet segment, leverage and utilize adjacency state information learned from the multicast routing protocol executing with the underlying transport network of the local data center to facilitate selection of a designated forwarder for the data center interconnect. For example, PEs 6A, 6A', 6A" providing multi-homed connectivity to EVPN 23 leverage and utilize adjacency state information learned from the multicast routing protocol executing within underlying transport network 22 of data center 5A to facilitate DF election for Ethernet segment 13A. Any failure of routers or switches within underlying transport network 22 within data center 5A, for example, will be reflected in the adjacency state information of the interior multicast routing protocol. Moreover, data center-facing routing instances within PEs 6A, 6A' and 6A" participating in the multicast routing protocol learn of the network event, such as a link failure, and inject the adjacency information into an EVPN protocol executing on the routers.

Utilizing this additional information, an enhanced EVPN protocol executing on each PE 6A, 6A', 6A" causes the respective PE to participates in DF election for EVPN 23 if and only if the adjacency state for the multicast routing protocol has been successfully created such that connectivity has been established to CE 8A. The adjacency state information may, for example, indicate whether, using the multicast routing protocol, a multicast distribution tree (e.g., P2MP MPLS tunnels) has been fully constructed within network 22 as an underlying transport for multicast traffic from PE 6A to CE router 8A. If the adjacency state information indicates that an underlying transport for multicast traffic has not been established within underlying network 22 of local data center 5A so as to provide transport services from a given one of PEs 6A, the EVPN protocol executing on that given PE removes the PE from DF consideration, i.e., the PE does not participate in the DF election process. In this way, by incorporating the adjacency state information within DF election and re-election for the Ethernet segment with respect to EVPN 23, loss of traffic 21 from EVPN 23 may be avoided.

Figure 3:
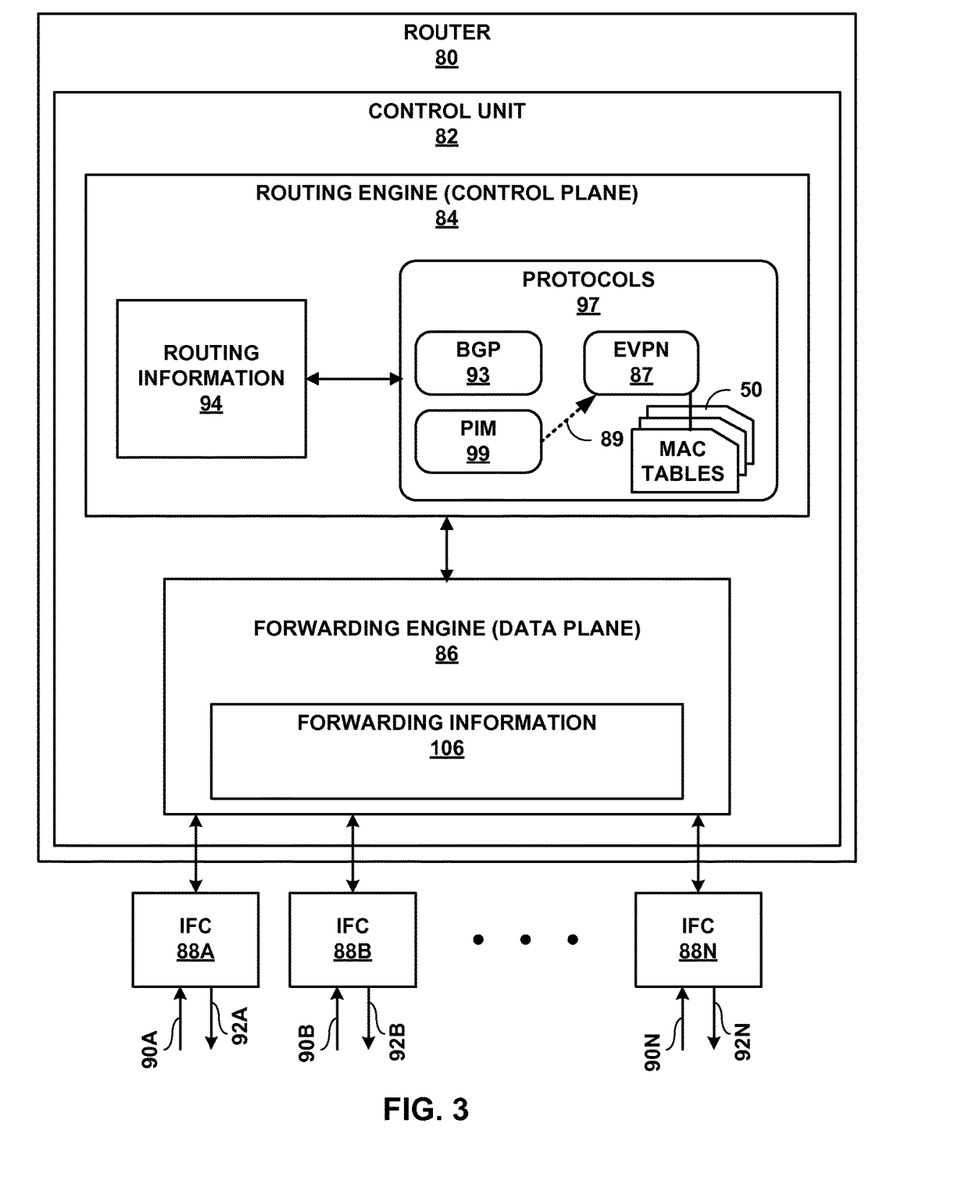
FIG. 3 is a block diagram illustrating an exemplary router capable of performing the disclosed techniques.

FIG. 3 is a block diagram illustrating an exemplary router 80 capable of performing the disclosed techniques. In general, router 80 may operate substantially similar to PEs 6 of FIG. 1

In this example, router 80 includes interface cards 88A-88N ("IFCs 88") that receive multicast packets via incoming links 90A-90N ("incoming links 90") and send multicast packets via outbound links 92A-92N ("outbound links 92"). IFCs 88 are typically coupled to links 90, 92 via a number of interface ports. Router 80 also includes a control unit 82 that determines routes of received packets and forwards the packets accordingly via IFCs 88.

Control unit 82 may comprise a routing engine 84 and a packet forwarding engine 86. Routing engine 84 operates as the control plane for router 80 and includes an operating system that provides a multi-tasking operating environment for execution of a number of concurrent processes. Routing engine 84, for example, execute software instructions to implement one or more control plane networking protocols 97. For example, protocols 97 may include one or more routing protocols, such as Border Gateway Protocol (BGP) 99, for exchanging routing information with other routing devices and for updating routing information 94. Routing information 94 may describe a topology of the computer network in which router 80 resides, and may also include routes through the shared trees in the computer network. Routing information 94 describes various routes within the computer network, and the appropriate next hops for each route, i.e., the neighboring routing devices along each of the routes. Routing engine 84 analyzes stored routing information 94 and generates forwarding information 106 for forwarding engine 86. Forwarding information 106 may associate, for example, network destinations for certain multicast groups with specific next hops and corresponding IFCs 88 and physical output ports for output links 92. Forwarding information 106 may be a radix tree programmed into dedicated forwarding chips, a series of tables, a complex database, a link list, a radix tree, a database, a flat file, or various other data structures.

In addition, routing engine 84 executes EVPN protocol 87, which operates to communicate with remote routers to establish and maintain an EVPN, such as EVPN 23 of FIG. 1, for transporting L2 communications through an intermediate network so as to logically extend an Ethernet network through the intermediate network. EVPN protocol 87 may, for example, communicate with EVPN protocols executing on remote routers to establish pseudowires for the EVPN and maintain MAC address tables 50 associating L2 customer MAC addresses with specific pseudowires. When implementing an EVPN, L2 MAC learning may be performed in the control plane by exchanging, with remote PE devices, BGP messages containing customer MAC addresses. EVPN protocol 87 communicates information recorded in MAC tables 50 to forwarding engine 86 so as to configure forwarding information 56. In this way, forwarding engine 30A may be programmed with associations between each PW and output interface and specific source customer MAC addresses reachable via those PWs. Additional example information with respect to the EVPN protocol is described in "BGP MPLS Based Ethernet VPN," draft-ietf-l2vpn-evpn-11, Internet Engineering Task Force (IETF), Jul. 2, 2014, the entire contents of which are incorporated herein by reference.

Further, routing engine 84 executes a multicast routing protocol, such as PIM protocol 99 (e.g., PIM-SM of PIM BIDIR), for communicating with PIM protocols on routers or other devices internal to the data center to establish and maintain one or more multicast distribution trees, such as tunnels, for transporting multicast traffic. Additional information regarding PIM protocols may be found in Adams, A., et al., "Protocol Independent Multicast Version 2—Dense Mode Specification," RFC 3973, 2005; Fenner, B., et al., "Protocol Independent Multicast-Sparse Mode (PIM-SM): Protocol Specification (Revised)," RFC 4601, 2006; Holbrook, H. and B. Cain, "Source-Specific Multicast for IP," IETF RFC 4607, 2006; and Handley, M., et al., "Bidirectional Protocol Independent Multicast (BIDIRPIM)," IETF RFC 5015, 2007, the entire contents of each of which are incorporated by reference herein.

As shown in FIG. 3, responsive to any changes in the status of the multicast distribution mechanisms established with peer routers within the data center, PIM protocol 99 outputs adjacency information 89 to EVPN 87. Adjacency information 89 refers to data representative of the current status of any multicast distribution mechanisms signaled with peer routers within the data center, such as a current status of one or more multicast distribution trees within the data center. Adjacency information 89 may, for example, indicate whether a multicast distribution tree currently provides connectivity to customer network(s) within the data center. For example, upon receiving a PIM message from a peer PIM router within the data center indicating a topology-changing event, PIM protocol 99 operates to modify the multicast distribution tree in accordance with the PIM protocol. In the event that any modification alters the current status (e.g., UP or DOWN) with respect to reachability of customer networks, PIM protocol 99 additionally outputs an alert to inform EVPN protocol 87 of the status change. As described herein, EVPN 87 implements an enhanced DF election for EVPN instances so as to leverage and utilize adjacency state information 89 learned from the multicast routing protocol 104 that controls multicast distribution within the underlying transport network of the local data center. By leveraging adjacency state information 89, EVPN protocol 87 facilitates selection of a designated forwarder for the Ethernet segment in a manner that may avoid loss of traffic from the EVPN in situations where a topology event in the underlying transport network of the data center would otherwise prevent router 80 from forwarding traffic from the EVPN to the customer networks within the data center.

The architecture of router 80 illustrated in FIG. 3 is shown for exemplary purposes only. The invention is not limited to this architecture. In other examples, router 80 may be configured in a variety of ways. In one example, some of the functionally of control unit 82 may be distributed within IFCs 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors which execute software instructions. In that case, the various software modules of control unit 82 may comprise executable instructions stored on a computer-readable medium, such as computer memory or hard disk.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset.

Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Figure 4:
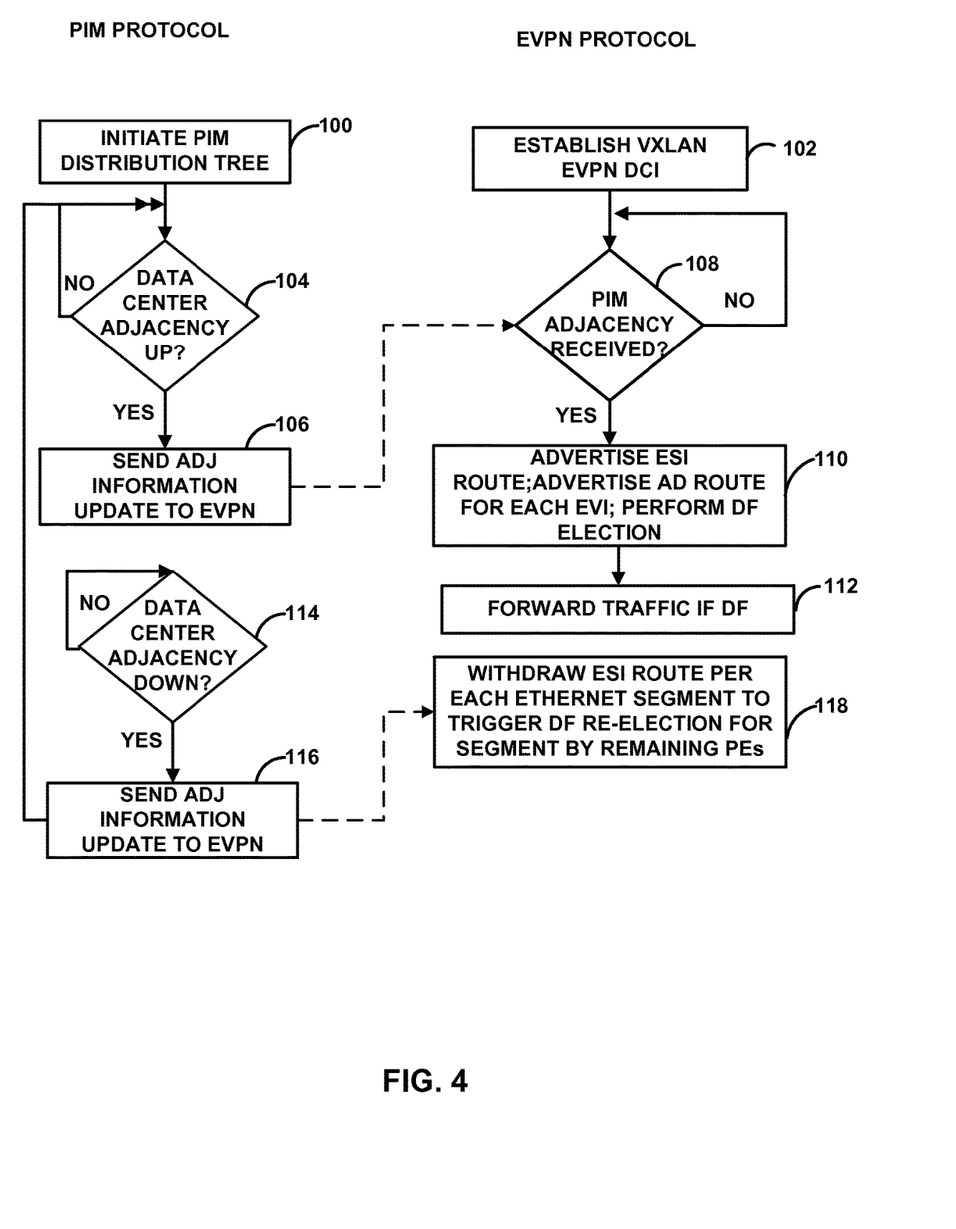
FIG. 4 is a flow diagram illustrating example operation of a router in accordance with the techniques described herein.

FIG. 4 is a flow diagram illustrating example operation of a router, such as any of PE routers 6 of FIG. 1, in accordance with the techniques described herein. In particular, FIG. 4 illustrates operation of a PIM protocol and an enhanced EVPN protocol (e.g. PIM protocol 99 and EVPN 87 of FIG. 3) executing within a control plane of a router. For purposes of example, FIG. 4 is described with respect to router 80 of FIG. 3 which may, for example, represent any of PE routers 6 of FIGS. 1-2.

Initially, such as at boot time, PIM protocol 99 operates to communicate with transport routers within the data center 5A to establish tunnels within VXLAN 14A using a multicast routing protocol, such as PIM-SM or PIM-BIDIR, for transporting multicast data (100). For example, PIM protocol 99 may communicate with peer routers within transport network 22 of data center 5 to establish one or more tunnels for transporting multicast traffic from the router on which the PIM protocol is operating (e.g., PE 6A of FIG. 1) through the transport network and to the customer network (e.g. CE router 8A of customer network 7A). Upon establishing the tunnels (104), PIM protocol 99 outputs an alert 89 affirmatively indicating to EVPN protocol 87 that PIM adjacency state has been successfully signaled with local PIM-enabled routers within transport network 22 so as to set up transport mechanisms (e.g., tunnels) for transporting multicast traffic to CE router 8A (106).

EVPN protocol 87 independently operates from PIM protocol 99 to communicate with remote routers to establish an EVPN layer two (L2) data center interconnect (DCI) between data center 5A and the second, remote data center 5B (102). Moreover, EVPN protocol 87 is configured to operate the router 80 as one of a group of PE routers 6 that provide either active-active or single-active multi-homed connectivity for the VXLAN 14A of data center 5A to the EVPN DCI through Ethernet segment 13A. In this example, prior to participating in a given Ethernet EVPN instance, EVPN protocol 87 waits to receive alert 89 from PIM protocol 99 affirmatively indicating that PIM adjacency state has been successfully signaled with local PIM-enabled routers within transport network 22 so as to create transport mechanisms (e.g., tunnels) for transporting multicast traffic to CE router 8A (108).

Once EVPN protocol 87 receives alert 89 affirmative indicating adjacency state information, the EVPN protocol 87 signals, to remote PE routers, the need to update their layer two (L2) forwarding tables and to trigger EVPN designated forwarder (DF) election for the Ethernet segment (110). This may be accomplished, for example, by EVPN protocol 87 directing BGP protocol 93 to output a routing protocol message advertising an Ethernet Segment Identifier (ESI), which is typically unique across all EVPN instances (EVIs). In addition, for each EVI, EVPN protocol 87 directs BGP protocol 93 to output a routing protocol message advertising an Ethernet Auto-Discovery (AD) route specifying the relevant ESI for the Ethernet segment coupled to the EVPN instance. For example, EVPN protocol 87 specifies BGP Network Layer Reachability Information (NLRI) for EVPN 23 and may define different route types for conveying EVPN information via BGP protocol 93. The EVPN NLRI is typically carried in BGP using BGP Multiprotocol Extensions. An Ethernet Auto-Discovery (AD) route, for example, specifies a Route Distinguisher (RD) (e.g., an IP address of an MPLS Edge Switch (MES)), ESI, Ethernet Tag Identifier, and MPLS label. MAC advertisement routes include a RD, ESI, Ethernet Tag Identifier, MAC address and MAC address length, IP address and IP address length, and MPLS label. An Ethernet Segment route includes a Route Distinguisher and Ethernet Segment Identifier. In this way, EVPN protocol 87 initiates EVPN DF election for the Ethernet segment on a per EVPN instance basis, and participates within that election for each EVPN instance, in response to receiving an affirmative alert 89 from PIM protocol 99. That is, DF election may be at the granularity of each ESI, EVI combination. If elected DF, the router forwards traffic from EVPN 23 into the local data center 5A (112).

In the event that any modification to the underlying transport network, such as a failed link or node, impairs PIM protocol from maintaining with peer PIM routers the distribution mechanisms for transporting multicast packets within the data center (YES to 114), PIM protocol 99 outputs an alert to inform EVPN protocol 87 of the change to the adjacency information (116). In response, EVPN protocol 87 directs BGP 93 to output a routing protocol message withdrawing the Ethernet Segment route, thereby withdrawing itself as DF for all associated EVIs, removing itself from DF consideration and triggering DF re-election for each of the EVIs (118). As such, for each EVI, remote PE routers of the EVPN perform a MAC flush operation to clear any MAC tables and initiate DF re-election without considering the recently withdrawn PE as a candidate for DF for the EVPN instance. In this way, the EVPN protocol leverages and utilizes adjacency state information learned from the multicast routing protocol executing local to the data center to facilitate selection of a designated forwarder for the Ethernet segment.

Various embodiments have been described. These and other embodiments are within the scope of the following examples.

The invention claimed is:

1. A method comprising:
executing, with a first provider edge (PE) router of a plurality of PE routers coupled to a first data center, an Ethernet virtual private network (EVPN) protocol to establish an EVPN data center interconnect (DCI) between the first data center and a second data center, wherein the plurality of PE routers of the first data center provide multi-homed connectivity to the EVPN;
executing, with the first PE router a multicast routing protocol, to establish one or more tunnels within the first data center to transport multicast traffic between the first PE router and one or more customer networks within the first data center; and
based on a current status of the one or more tunnels within the first data center, selectively participating, with the first PE router, in a designated forwarder (DF) election of one or more of the PE routers for forwarding traffic from the EVPN into the first data center.

2. The method of claim 1, wherein selectively participating, with the first PE router, in the DF election comprises:
detecting, with the multicast routing protocol executing on the first PE router, a change in an adjacency status associated with the one or more tunnels within the first data center; and
outputting an alert from the multicast routing protocol on the first PE router to the EVPN protocol on the first PE router to inform the EVPN protocol of the status change.

3. The method of claim 2, further comprising, responsive to the alert indicating that the one or more tunnels are operative, outputting a first routing protocol message with the first PE router announcing an EVPN Ethernet Segment Instance (ESI) route with the first PE router to trigger election of a DF for the EVPN and to include the first PE router as a candidate for the DF election.

4. The method of claim 3, further comprising, responsive to the alert indicating that the one or more tunnels are no longer operative, outputting a second routing protocol message with the first PE router withdrawing the EVPN ESI route to trigger re-election of the DF for the EVPN and withdrawing the first PE router as a candidate for the DF election.

5. The method of claim 3, wherein outputting the first routing protocol message comprises causing, with the EVPN protocol, a border gateway protocol (BGP) to output a BGP message specifying the EVPN ESI route.

6. The method of claim 1, wherein the multicast routing protocol comprises a protocol independent multicast (PIM) routing protocol.

7. The method of claim 1, wherein executing a multicast routing protocol to establish one or more tunnels comprises establishing a virtual extensible local area network (VXLAN) within the first data center using the multicast routing protocol.

8. A router comprising:
a processor executing:
an Ethernet virtual private network (EVPN) protocol to establish a data center interconnect (DCI) between a first data center and a second data center using an Ethernet virtual private network (EVPN), wherein the router is one of a plurality of provider edge (PE) routers that are multi-homed to the first data center and that provide the EVPN DCI, and
a multicast routing protocol to establish one or more tunnels within the first data center to transport multicast traffic from the router to one or more customer networks within the first data center,
wherein the multicast routing protocol outputs an alert to the EVPN protocol to indicate a current status of the one or more tunnels within the first data center, and
wherein, based on a current status of the one or more tunnels, the EVPN protocol selectively includes the router as a candidate for a designated forwarder (DF) election of one or more of the PE routers for forwarding traffic from the EVPN into the first data center.

9. The router of claim 8, wherein the multicast routing protocol is configured to detect a change in an adjacency status associated with the one or more tunnels within the first data center and, in response, output the alert to the EVPN protocol on the router to inform the EVPN protocol of the status change.

10. The router of claim 8, wherein the EVPN protocol is configured to, responsive to the alert indicating that the one or more tunnels are operative, cause the router to output a first routing protocol message announcing an EVPN Ethernet Segment Instance (ESI) route with the router to trigger election of a DF for the EVPN and to include the router as a candidate for the DF election.

11. The router of claim 10, wherein the EVPN protocol is configured to, responsive to the alert indicating that the one or more tunnels are no longer operative, cause the router to output a second routing protocol message withdrawing the EVPN ESI route to trigger re-election of the DF for the EVPN and withdrawing the first PE router as a candidate for the DF election.

12. The router of claim 10, further comprising a border gateway protocol (BGP) executing on the processor to output a BGP message specifying the EVPN ESI route.

13. The router of claim 8, wherein the multicast routing protocol comprises a protocol independent multicast (PIM) routing protocol.

14. The router of claim 8, wherein the tunnels comprise virtual extensible local area network (VXLAN) tunnels.

15. A non-transitory computer-readable medium comprising instruction that cause a processor of a router of two or more multi-homed provider edge (PE) routers of an Ethernet virtual private network (EVPN) coupled to a first data center to:
execute, with the router, an Ethernet virtual private network (EVPN) protocol to establish an EVPN data center interconnect (DCI) between the first data center and a second data center;
execute, with the router a multicast routing protocol, to establish one or more tunnels within the first data center to transport multicast traffic between the first PE router and one or more customer networks within the first data center; and
based on a current status of the one or more tunnels within the first data center, selectively participate, with the router, in a designated forwarder (DF) election of one or more of the PE routers for forwarding traffic from the EVPN into the first data center.

16. The non-transitory computer-readable medium of claim 15, wherein the instructions further cause the processor to:
detect, with the multicast routing protocol executing on the router, a change in an adjacency status associated with the one or more tunnels within the first data center; and
output an alert from the multicast routing protocol on the first PE router to the EVPN protocol on the router to inform the EVPN protocol of the status change.

17. The non-transitory computer-readable medium of claim 16, wherein the instructions further cause the processor to, responsive to the alert indicating that the one or more tunnels are operative, output a first routing protocol message announcing an EVPN Ethernet Segment Instance (ESI) route to trigger election of a DF for the EVPN and to include the router as a candidate for the DF election.

18. The non-transitory computer-readable medium of claim 17, wherein the instructions further cause the processor to, responsive to the alert indicating that the one or more tunnels are no longer operative, output a second routing protocol message withdrawing the EVPN ESI route to trigger re-election of the DF for the EVPN and withdrawing the router as a candidate for the DF election.

19. The non-transitory computer-readable medium of claim 17, wherein the routing protocol message comprises a border gateway protocol (BGP) message specifying the EVPN ESI route.

* * * * *